(12) United States Patent
Fujimori et al.

(10) Patent No.: US 8,111,288 B2
(45) Date of Patent: *Feb. 7, 2012

(54) IMAGE PROCESSING CONTROLLER AND TEST SUPPORT SYSTEM

(75) Inventors: Kazuya Fujimori, Osaka (JP); Toshihiro Konaka, Osaka (JP); Teruhiko Maeda, Osaka (JP)

(73) Assignee: Keyence Corporation, Osaka (JP)

( * ) Notice: Subject to any disclaimer, the term of this patent is extended or adjusted under 35 U.S.C. 154(b) by 756 days.

This patent is subject to a terminal disclaimer.

(21) Appl. No.: 12/269,093

(22) Filed: Nov. 12, 2008

(65) Prior Publication Data

US 2009/0153672 A1    Jun. 18, 2009

(30) Foreign Application Priority Data

Dec. 13, 2007 (JP) ................................. 2007-321475

(51) Int. Cl.
*H04N 7/18* (2006.01)

(52) U.S. Cl. ............ 348/129; 348/86; 348/92; 348/125; 382/141

(58) Field of Classification Search ............... 348/86, 348/92, 125, 129; 382/141
See application file for complete search history.

(56) References Cited

U.S. PATENT DOCUMENTS

| | | | |
|---|---|---|---|
| 6,408,429 B1 * | 6/2002 | Marrion et al. ............... 717/100 |
| 6,535,630 B1 | 3/2003 | Saeki |
| 6,549,655 B1 | 4/2003 | Ikushima et al. |
| 6,665,441 B1 | 12/2003 | Nishio |
| 6,704,441 B1 | 3/2004 | Inagaki et al. |
| 6,774,909 B1 | 8/2004 | Nishio |
| 6,807,288 B2 | 10/2004 | Inagaki |
| 7,215,816 B2 | 5/2007 | Ikushima |
| 7,274,812 B2 | 9/2007 | Saeki |
| 7,403,218 B2 | 7/2008 | Saeki |
| 7,606,409 B2 * | 10/2009 | Funakoshi ................... 382/141 |
| 7,929,024 B2 * | 4/2011 | Katsuyama ............... 348/222.1 |
| 2002/0186302 A1 * | 12/2002 | Pulkinnen ................ 348/207.99 |
| 2004/0005859 A1 * | 1/2004 | Ghercioiu et al. ........... 455/3.01 |
| 2004/0061778 A1 * | 4/2004 | Yamane et al. ................. 348/86 |
| 2004/0066417 A1 * | 4/2004 | Anabuki et al. ............... 345/848 |
| 2004/0212714 A1 * | 10/2004 | Mikoshiba et al. ....... 348/333.11 |
| 2011/0043621 A1 * | 2/2011 | Terada et al. ................. 348/135 |

FOREIGN PATENT DOCUMENTS

JP   09-288568   11/1997

OTHER PUBLICATIONS

U.S. Appl. No. 12/256,123, filed Oct. 22, 2008.
U.S. Appl. No. 12/256,708, filed Oct. 23, 2008.
U.S. Appl. No. 12/256,772, filed Oct. 23, 2008.

* cited by examiner

*Primary Examiner* — Duyen Doan
(74) *Attorney, Agent, or Firm* — Kilyk & Bowersox, P.L.L.C.

(57) ABSTRACT

There is provided an image processing controller capable of faithfully recreating a process of a series of image processing based upon a control program, which includes: a history buffer for extracting a result of the measurement in each processing unit, executed by the program executing section, as history information in each measurement cycle and holding the extracted result in association with the processing unit and the measurement cycle; a history buffer for extracting a camera image acquired from a camera by the program executing section during execution of a control program, as history information in each the measurement cycle and holding the extracted image in association with the measurement cycle; and a history information transferring section for transferring history information, held in the history buffers, to the PC.

5 Claims, 10 Drawing Sheets

FIG. 9B

RESULT VIEW — 45

| | UNIT REFERENCE VARIABLE/RESULT | SYSTEM VARIABLE | LOCAL VARIABLE | GLOBAL VARIABLE | | | | |
|---|---|---|---|---|---|---|---|---|
| NAME | DEFINITION | HEAD INDEX | NUMBER OF DISPLAYS | CURRENT VALUE | INITIAL VALUE | TYPE | FORM |
| ⊞ IU[0003].RSLT | - | - | - | - | - | RESULT DATA | - |
| #x | - | - | - | 255 | 255 | LOCAL VARIABLE | SCALAR |
| #y | - | - | - | 250 | 250 | LOCAL VARIABLE | SCALAR |
| &Cam1Img | - | - | - | - | - | IMAGE VARIABLE | CAMERA 1 |

EXTRACTION·LIST

IMAGE PROCESSING CONTROLLER AND TEST SUPPORT SYSTEM

CROSS-REFERENCE TO RELATED APPLICATIONS

The present application claims foreign priority based on Japanese Patent Application No. 2007-321475, filed Dec. 13, 2007, the contents of which is incorporated herein by reference.

BACKGROUND OF THE INVENTION

1. Field of the Invention

The present invention relates to an image processing controller and a test support system, and more particularly, the present invention relates to an improvement in an image processing controller that outputs a determination signal based upon a camera image obtained by photographing an object to be tested.

2. Description of the Related Art

As an image processing controller which performs image processing on a camera image obtained by photographing an object to be tested and outputs as a processing result a determination signal indicating a determination result based upon a shape, a position and a camera image of the object to be tested, or the like, one capable of changing a series of processing procedure is known (e.g. Japanese Unexamined Patent Publication No. H09-288568). Typically a control program for making such an image processing controller execute a series of processing procedure is created by an editor (software) that operates on an information processing terminal such as a PC (personal computer). A user can transfer the created control program to the image processing controller, so as to perform a desired test on the object to be tested.

Generally, when an object to be tested is determined to have abnormality or deficiency as a result of image processing, verification as to whether or not image processing was normally performed requires checking of a camera image and a measurement result acquired at the time of the image processing. The foregoing image processing controller has conventionally been provided with the function of holding a camera image and a measurement result, acquired when executing a control program, as history information. Making such history information displayed on a display enables checking of a camera image and a measurement result acquired when executing a control program. However, since a camera image and a measurement result are accumulated as separate pieces of information, when the measurement result is intended to be graphically displayed on the camera image, it has been necessary to execute measurement again and recalculate a measurement value based upon the camera image so as to obtain a measurement result from the camera image. That is, in the conventional image processing controller, it has not been possible to graphically display a measurement result accumulated as history information on a camera image without re-execution of a control program. There has further been a problem in that, when a measurement result is intended to be graphically displayed on a camera image, a control program needs to be executed again, which necessitates a suspension of operation of the controller. Moreover, graphically displaying a measurement result on a camera image on the PC has required a simulation of image processing.

There has further been a problem in that, when a control program is executed again, a state of a variable (counter or the like) which changes in time series every time of repeated execution of the control program is not reflected, causing generation of a difference between an actual measurement result and a recalculation result, and hence a history cannot be accurately recreated. There has further been a problem in that in a case of a control program for performing image processing with reference to an external input, the state of the external input changes.

SUMMARY OF THE INVENTION

As described above, there has been a problem with the conventional image processing controller in that a measurement result accumulated as history information cannot be graphically displayed on a camera image without re-execution of a control program. There has further been a problem in that, when a measurement result is intended to be graphically displayed on a camera image, a control program needs to be executed again, which necessitates a suspension of operation of the controller. There has also been a problem in that graphically displaying a measurement result on a camera image on the PC requires a simulation of image processing.

The present invention was made in view of the above circumstances, and has an object to provide an image processing controller and a test support system, capable of faithfully recreating a process of a series of image processing based upon a control program. Especially, an object is to provide an image processing controller capable of graphically displaying a measurement result accumulated as history information on a camera image without re-execution of a control program. Further, an object is to provide an image processing controller capable of graphically displaying a measurement result accumulated as history information on a camera image without the suspension of operation of the controller. Moreover, an object is to provide a test support system capable of graphically displaying a measurement result accumulated as history information on a camera image without a simulation of image processing on the program creation apparatus.

An image processing controller according to a first aspect of the present invention is an image processing controller, used in a test support system including a camera which photographs an object to be tested, to generate a camera image, the image processing controller which acquires the camera image from the camera, extracts a measurement result from the camera image, and determines the quality of the object to be tested based upon this measurement result, to output a determination signal, and a program creation apparatus which creates a control program for the image processing controller, the program creation apparatus having a processing unit storing part for holding two or more processing units that show image processing, a flowchart generating part for arranging the processing units on an execution flow that is started with a start symbol and completed with an end symbol, to generate a flowchart, a program generating part for generating a control program for the image processing controller based upon the flowchart, and a program transferring part for transferring the control program to the image processing controller. The image processing controller includes: a program storing part for holding the control program transmitted from the program creation apparatus; a program executing part for repeatedly executing the control program with a flow from the start symbol to the end symbol on the flowchart taken as a measurement cycle; a first history information accumulating part for extracting a result of the measurement in each of the processing units, executed by the program executing part, as history information in each the measurement cycle and holding the extracted result in association with the processing unit and the measurement cycle; a second history information accumulating part for extracting the camera image, acquired from the camera by the program executing part during execution of the control program, as history information in each the measurement cycle and holding the extracted image in association with the measurement cycle; and a history information transferring part for transferring history information, held in the first history information accumulating part and the second history information accumulating part, to the program creation apparatus.

In this image processing controller, a measurement result in each processing unit and a camera image acquired from a camera are extracted and held as history information in each measurement cycle when executing a control program, and are transmitted to a program creation apparatus according to need. At that time, since the measurement result extracted as the history information is held in association with the processing unit, it is possible to recreate a process of a series of image processing based upon the control program in units of processing units. In particular, since the measurement result and the camera image when executing the control program are extracted as the history information, and are both held in association with the measurement cycle, displaying the measurement result accumulated as the history information in this manner enables graphical display of the measurement result on the camera image without re-execution of the control program. It is thus possible to faithfully recreate a series of image processing based upon the control program. Further, since it is just that the measurement result accumulated as the history information is displayed, and recalculation for obtaining the measurement result from the camera image is not required, it is possible to display the measurement result on the camera image without the suspension of operation of the controller.

An image processing controller according to a second aspect of the present invention is configured such that, in addition to the above configuration, the first history information accumulating part extracts history information based upon a determination result of the object to be tested in a previously specified processing unit. With such a configuration, since history information is extracted based upon a determination result of the object to be tested in a previously specified processing unit, it is possible to accumulate desired history information in accordance with a determination result of the quality of the object to be tested.

An image processing controller according to a third aspect of the present invention includes, in addition to the above configuration, an accumulation condition deciding part for deciding an upper limit of the number of accumulations of the history information, and is configured such that the first and second history information accumulating part rewrite newly extracted history information onto old history information based on the upper limit of the number of accumulations.

An image processing controller according to a fourth aspect of the present invention is an image processing controller, used in a test support system including a camera which photographs an object to be tested, to generate a camera image, the image processing controller which extracts a measurement result from the camera image, and determines the quality of the object to be tested based upon this measurement result, to output a determination signal, a display which is display controlled by the image processing controller, and displays the measurement result, an operational unit for operating the image processing controller, and a program creation apparatus which creates a control program for the image processing controller, the program creation apparatus having a processing unit storing part for holding two or more processing units that show image processing where a parameter is changeable, a flowchart generating part for arranging the processing units on an execution flow that is started with a start symbol and completed with an end symbol, to generate a flowchart, a program generating part for generating a control program for the image processing controller based upon the flowchart, and a program transferring part for transferring the control program to the image processing controller. The image processing controller includes: a program storing part for holding the control program transmitted from the program creation apparatus; a program executing part for repeatedly executing the control program with a flow from the start symbol to the end symbol on the flowchart taken as a measurement cycle; a first history information accumulating part for extracting a result of the measurement in each of the processing units, executed by the program executing part, as history information in each of the measurement cycles and holding the extracted result in association with the processing unit and the measurement cycle; a second history information accumulating part for extracting the camera image, acquired from the camera by the program executing part during execution of the control program, as history information in each of the measurement cycles and holding the extracted image in association with the measurement cycle; and a history displaying part for displaying, on the display, history information held in the first history information accumulating part and the second history information accumulating part, the image processing controller being configured such that the history displaying part displays, on the camera image, the measurement result held in association with the processing unit selected by an operation of the operational unit based upon the parameter of the processing unit.

A test support system according to a fifth aspect of the present invention is a test support system, including: a camera which photographs an object to be tested, to generate a camera image; the image processing controller which extracts a measurement result from the camera image, and determines the quality of the object to be tested based upon this measurement result, to output a determination signal; and a program creation apparatus which creates a control program for the image processing controller, the program creation apparatus having a processing unit storing part for holding two or more processing units that show image processing where a parameter is changeable, a flowchart displaying part for displaying, on an edition screen, a flowchart generated by arranging the processing units on an execution flow that is started with a start symbol and completed with an end symbol, a program generating part for generating a control program for the image processing controller based upon the flowchart, and a program transferring part for transferring the control program to the image processing controller. The test support system is configured such that the image processing controller includes a program storing part for holding the control program transmitted from the program creation apparatus, a program executing part for repeatedly executing the control program with a flow from the start symbol to the end symbol on the flowchart taken as a measurement cycle, a first history information accumulating part for extracting a result of the measurement in each of the processing units, executed by the program executing part, as history information in each of the measurement cycles and holding the extracted result in association with the processing unit and the measurement cycle, a second history information accumulating part for extracting the camera image, acquired from the camera by the program executing part during execution of the control program, as history information in each of the measurement cycles and holding the extracted image in association with the measurement cycle, and a history information transferring part for transferring history information held in the first history information accumulating part and the second history information accumulating part to the program creation apparatus, the program creation apparatus includes a history information storing part for holding the history information transferred from the image processing controller, and a history displaying part for displaying the history information on the edition screen, and the history displaying part displays, on the camera image, the measurement result in association with the processing unit selected on the flowchart based upon the parameter of the processing unit.

In this test support system, a measurement result in each processing unit and a camera image acquired from a camera are extracted and held as history information in each measurement cycle when executing a control program, and are transmitted to a program creation apparatus according to need. At that time, the measurement result, extracted as the history information, is held in association with the processing unit. In the program creation apparatus, when history information is to be displayed on an edition screen, a measurement result associated with a processing unit selected on a flowchart is displayed, and hence it is possible to recreate a process of a series of image processing based upon a control program in units of processing units without a simulation of image processing. At that time, since display is made based upon a parameter of the processing unit, it is possible to graphically display the measurement result accumulated as the history information on the camera image.

According to the test support system and the image processing controller in the present invention, since a measurement result extracted as history information is held in association with a processing unit, it is possible to recreate a process of a series of image processing based upon a control program in units of processing units. In particular, since the measurement result and the camera image when executing the control program are extracted as the history information, and are both held in association with the measurement cycle, displaying the measurement result accumulated as the history information in this manner enables display of the measurement result on the camera image without generation of a difference from an actual measurement result. It is thus possible to faithfully recreate a series of image processing based upon the control program. Further, since it is just that the measurement result accumulated as the history information is displayed, and recalculation for obtaining the measurement result from the camera image is not required, it is possible to display the measurement result on the camera image without the suspension of operation of the controller. Moreover, since display is made based upon a parameter of the processing unit, it is possible to graphically display the measurement result accumulated as the history information on the camera image.

BRIEF DESCRIPTION OF THE DRAWINGS

FIG. 9B is a view showing a part of FIG. 9A, showing the result view window 45.

DETAILED DESCRIPTION OF TEE PREFERRED EMBODIMENTS

<Test Support System>

Figure 1:
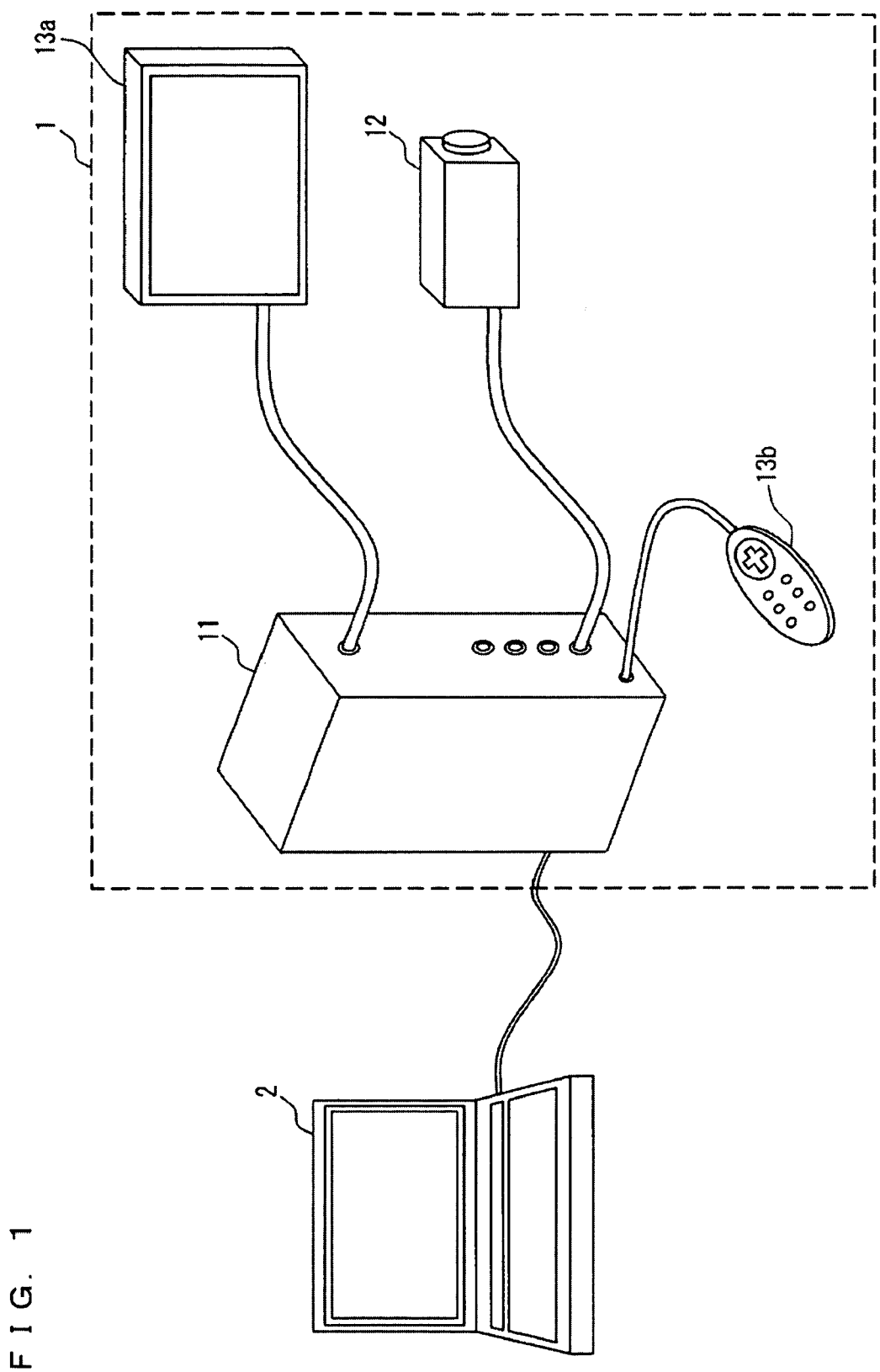
FIG. 1 is a perspective view showing a configurational example of a test support system according to an embodiment of the present invention.

FIG. 1 is a perspective view showing a configurational example of a test support system according to an embodiment of the present invention. This test support system includes an image processing apparatus 1 arranged on a conveyance line for an object to be tested, and a PC (personal computer) 2 which generates a control program for the image processing apparatus 1.

The image processing apparatus 1 includes an image processing controller 11, a camera 12, a display 13a, and an operational unit 13b, and is a sensor apparatus which outputs a determination signal based upon a camera image obtained from an object to be tested. This determination signal is inputted into a not shown PLC (Programmable Logic Controller) or the like and the image processing apparatus 1 is used as a FA (Factory Automation) sensor.

The camera 12 is an image-pickup device which photographs an object to be photographed, generates image data, and outputs the data as a camera image, and is detachably connected to the image processing controller 11. The camera 12 is arranged above the conveyance line along which the object to be tested is conveyed, and the object to be tested is photographed as the object to be photographed.

The display 13a is an output device for displaying a camera image obtained by photographing the object to be tested and an image processing result based upon the camera image. This display 13a is display-controlled by the image processing controller 11, and typically arranged in proximity to the image processing controller 11. That is, the display 13a is a display device for allowing a user to check an operating state of the image processing controller 11 in a case of the image processing controller 11 being in operation. The operational unit 13b is an input device for shifting a focus position and selecting a menu item on the display 13a.

The image processing controller 11 is a body unit of the image processing apparatus 1 which captures a camera image from the camera 12 and outputs, as a processing result a determination signal indicating a determination result based upon the camera image. The camera image acquiring operation is performed, for example, based upon an image pick-up unit trigger signal which is a control signal inputted from external equipment such as a PLC and defines the timing for capturing a camera image.

This image processing controller 11 is connected with four cameras 12 at the maximum, and based upon camera images obtained from these cameras 12, image processing is performed. A determination signal outputted from the image processing controller 11 is generated as a signal indicating a determination result about the quality of a product, or the like.

Further, this image processing controller 11 is connected with the display 13a and the operational unit 13b, and even not connected with the PC 2, the image processing controller 11 is capable of making the display 13a and the operational unit 13b operate respectively as the output device and the input device.

The PC 2 is a program creation apparatus which creates a control program for the image processing controller 11, and generates a control program by means of an editor (software) operated on the PC 2. At the time of creating the control program for the image processing controller 11, the program can be simulated on the PC 2 for checking its operation.

In the PC 2, layout information for definition of a display mode on the display 13a by the image processing controller 11 is created. This layout information is also created on the edition screen in the PC 2 by means of the editor, and test setting data including the control program and the layout information is generated.

The PC 2 and the image processing controller 11 of the image processing apparatus 1 are connected with each other through a communication network such as Ethernet (registered trademark) or the like. The PC 2 is detachably connected with a plurality of image processing controllers 11. The test setting data created on the PC 2 is transferred to the image processing controller 11 so that the test setting data inside the image processing controller 11 can be rewritten. Further, the test setting data inside the image processing controller 11 can be captured and edited on the PC 2. This PC 2 is typically connected with the image processing controller 11 in maintenance of the image processing apparatus 1.

In this test support system, a camera image acquired from the camera 12 during an operation of the image processing controller 11 and a measurement result extracted from the camera image are accumulated as history information, and can be displayed on the display 13a or the PC 2 according to need.

<System Configuration>

Figure 2:
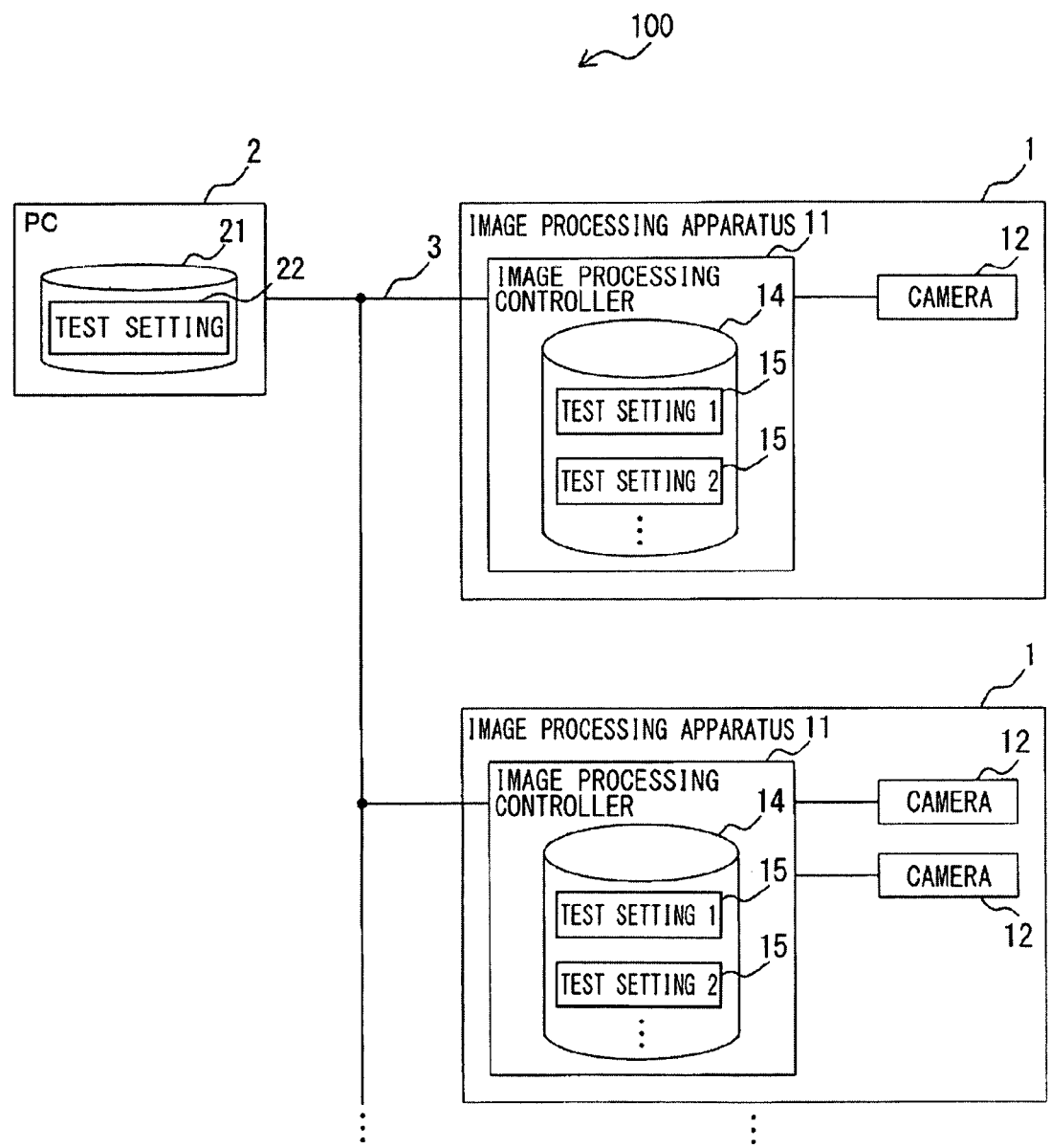
FIG. 2 is a block diagram showing an example of a system configuration of the test support system of FIG. 1.

FIG. 2 is a block diagram showing an example of a system configuration of the test support system of FIG. 1. This test support system 100 is configured by one PC 2 and a plurality of image processing apparatuses 1 connected to the PC 2 through a communication network 3. The control program created on the PC 2 is stored into a memory 21 as test setting data 22.

The test setting data 22 created on the PC 2 is transferred to the image processing controller 11 through the communication network 3. At this time, specifying a transfer destination and transferring the test setting data 22 can update test setting data 15 inside a memory 14 or add new test setting data inside the memory 14 in a desired image processing controller 11.

In this image processing controller 11, a plurality of test setting data 15 are held inside the memory 14 such as a flash memory. Each test setting data 15 includes control programs with different processing procedures or test contents, and the test setting data 15 as an object to be executed can be changed based upon a user operation.

In the PC 2, an operation is performed to obtain the test setting data 15 from the image processing controller 11 connected through the communication network 3, and edit the obtained data.

<Editor Screen>

Figure 3:
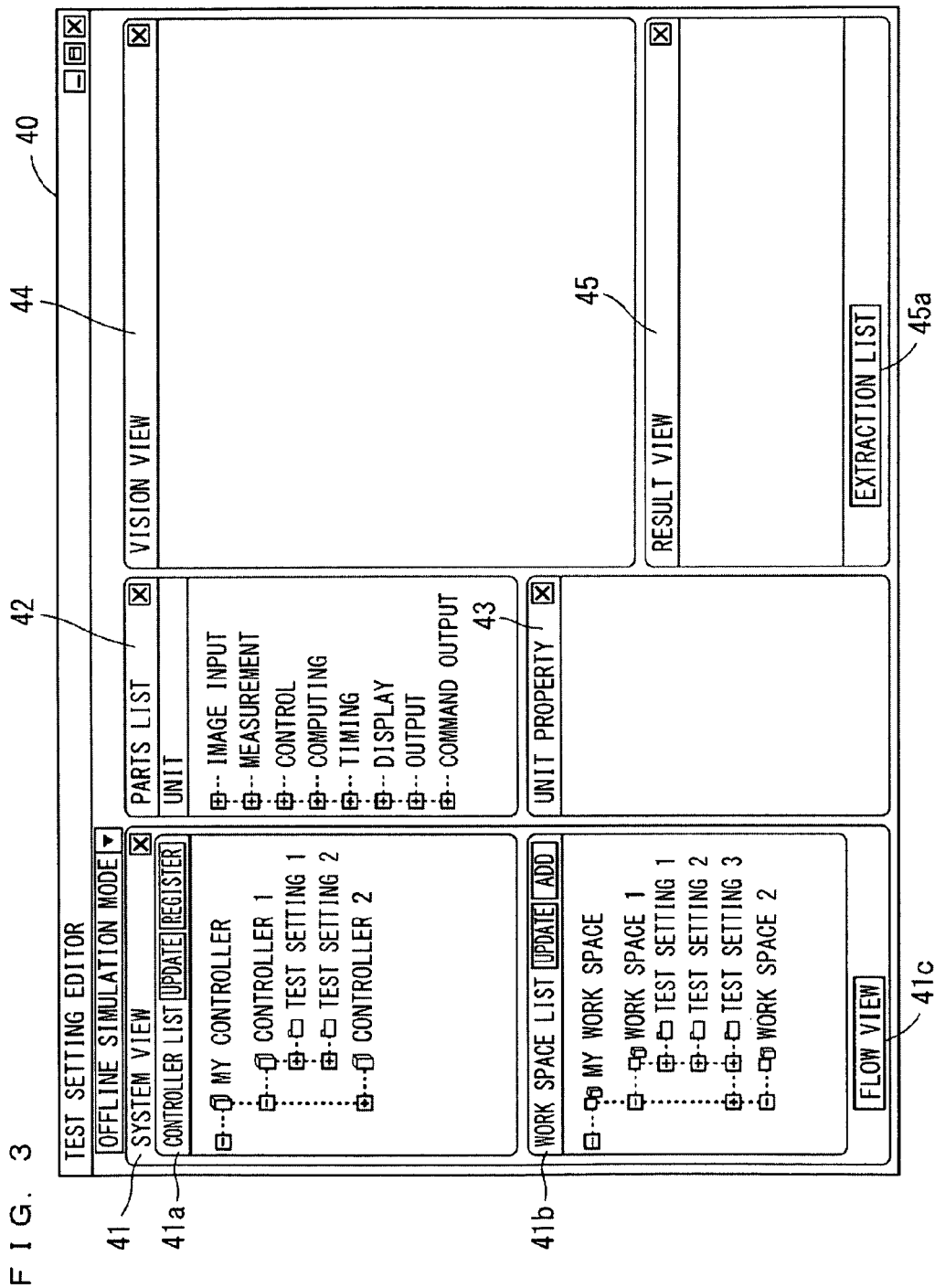
FIG. 3 is a view showing an example of an operation of a PC 2 in a test support system 100 of FIG. 2, showing an editor screen 40 for creating test setting data 22.

FIG. 3 is a view showing an example of an operation of the PC 2 in the test support system 100 of FIG. 2, and shows an editor screen 40 for creating the test setting data 22. The editor screen 40 is an edition screen for newly creating test setting data on the PC 2, or editing test setting data obtained from the image processing controller 11, and the editor screen 40 is displayed on the PC 2.

This editor screen 40 includes a plurality of screens, whose display positions and display ranges are changeable respectively. Specifically, the editor screen 40 includes a system view window 41, a parts-list window 42, a unit property window 43, a vision view window 44, and a result view window 45.

The system view window 41 is a window screen for list-displaying system configurations and test setting data as objects to be edited, and includes a controller list screen 41a and a work space list screen 41b.

The controller list screen 41a is a screen for list-displaying the image processing controllers 11 connected to the PC 2, and displays icons indicating the image processing controllers 11 and icons indicating the test setting data 15 held inside the image processing controllers 11.

The respective icons indicating the image processing controllers 11 and the test setting data 15 are displayed in tree form. Namely, the icons are displayed with the image processing controller 11 taken as an upper hierarchical layer and the test setting data 15 held inside the image processing controller 11 taken as a lower hierarchical layer, such that which image processing controller 11 holds each test setting data 15 is identifiable.

The work space list screen 41b is a screen for list-displaying test setting data as an object to be edited, and displays an icon indicating an operational region on the memory 21 provided in each image processing controller 1, and an icon indicating the test setting data. The operational region on the memory 21 is associated with the corresponding image processing controller 11, and is displayed as a work space. That is, the test setting data is held in each image processing controller 11, and edition is performed in the work space in each image processing controller 11.

The icons respectively indicating operational regions and the test setting data as thus described are displayed in tree form. Namely, the icons are displayed with the work space corresponding to the image processing controller 11 taken as an upper hierarchical layer and the test setting data inside this work space taken as a lower hierarchical layer, such that in which work space each test setting data is present is identifiable.

When an update button (icon) arranged in a heading area of the controller list screen 41a is operated, test setting data is newly obtained from the image processing controller 11, and the test setting data and the system configuration held on the PC 2 are updated to new ones. Further, when a registration button is operated, the test setting data created on the PC 2 is transferred to the image processing controller 11.

When an update button (icon) arranged in a heading area of the work space list screen 41b is operated, test setting data as an object to be edited is updated by test setting data obtained from the image processing controller 11. Further, when an addition button is operated, a new operational region is provided, and an icon indicating test setting data is added.

The parts-list window 42 is a window screen for displaying, as a unit list, processing units selectable at the time of creating test setting data. The processing unit is a symbol showing processing in which a parameter is changeable. As the processing units, provided are an image processing unit showing image processing, an image pick-up unit showing image pick-up processing, a control unit showing flow control processing, an output unit showing output processing, and the like. Arranging such a processing unit on a flowchart inside a later-described flow view window can create a control program including a desired flow sequence.

A plurality of processing units are displayed inside the parts-list window 42. In this example, the processing units are segmented into eight categories depending upon kinds of processing, and icons indicating the respective categories are displayed. Specifically, the processing units are segmented into categories of "image input", "measurement", "control", "computing", "timing", "display", "output", and "command output".

"Image input" is a category to which a processing unit concerning image pick-up belongs, and an image pick-up unit that captures a camera image belongs to this category. The image pick-up unit is associated with parameters for specifying a shutter speed, camera sensitivity, flash delay time, flash-on time, a camera as an object for image pick-up, a flash terminal, and a trigger terminal, as properties.

"Measurement" is a category to which a processing unit concerning measurement belongs, and image processing units such as a pattern search unit, an edge position detection unit, a blob detection unit, a color test unit, and a flaw detection unit belong to this category.

Pattern search is processing for scanning the inside of a search region on a camera image, to detect a position consistent with a previously registered pattern image. Edge position detection is processing for obtaining an average concentration in a direction vertical to a detection direction in a measurement region on the camera image, to detect a position of an edge from a change in concentration in the detection direction.

Blob detection is processing for binarizing a camera image and extracting a lump of pixels having the same concentration as blobs, to detect the number, an area and a barycentric position of blobs present inside the measurement region. A color test is processing for measuring a color inside a test region, and a numerical value corresponding to the color is extracted as a measurement result.

In the image processing concerning the measurement as thus described, a shape and a size of the object to be tested, a position of the object to be tested inside a camera image, and the like is detected, and the measurement value is outputted as an image processing result. Further, the measurement value is compared with a parameter previously specified by the user, and based upon this comparison result, the quality of the object to be tested, such as presence or absence of deficiency or abnormality, is determined and the determination result is outputted as an image processing result. Further, a camera image, embedded with a symbol graphically indicating a measurement region, a detected position of the object to be tested, and the like, is created and outputted as an image processing result.

"Control" is a category to which a processing unit concerning control belongs, and control units such as a repeat unit, a bypass unit, and an end symbol unit belong to this category. The repeat unit is a processing unit including a repeat start unit that shows a start point for the time of repetition of an execution flow, and a repeat end unit that shows an end point for the same, and the unit shows processing for repeating the execution flow between the start unit and the end unit until a prescribed condition is satisfied.

The bypass unit is a processing unit including a branching unit that branches the execution flow into two branch flows and a converging flow that converges the branch flows branched by the branching unit, and the unit shows processing for branching the execution flow under a prescribed condition. The end symbol is a display object for completing one flow sequence.

"Computing" is a category to which a processing unit concerning computing belongs, and image processing units such as a numerical value computing unit and a position correction unit belong to this category. "Timing" is a category to which a processing unit concerning a flow-shift stopping operation belongs, and control units such as a wait unit and an event wait unit belong to this category. The wait unit shows processing for stopping the flow shift just for a prescribed period of time. The event wait unit shows processing for stopping the flow shift until a terminal input or a variable value comes into a prescribed condition.

"Display" is a category to which a processing unit concerning display belongs, and an image processing unit such as a graphic display belongs to this category. The graphic display unit shows processing for referencing another processing unit and graphically displaying a processing result of the referenced processing unit.

"Output" is a category to which a processing unit concerning output belongs, and output units such as a terminal output unit, a result output unit and an image output unit belong to this category. The terminal output unit is associated with parameters for specifying a reference destination unit, a determination result, and an output destination terminal for a determination result, as properties. The result output unit is associated with parameters for specifying a reference destination unit, numerical value data showing a processing result, a data form (text form or binary form) when outputting numerical value data, and an output destination for numerical value data, as properties. The image output unit is associated with parameters for specifying a reference destination unit, a camera image, a data form when outputting image data, and an output destination for image data, as properties.

"Command output" is a category to which a processing unit concerning display belongs, and output units such as a command issue unit, a display pattern switch unit and a dialog display unit belong to this category. The command issue unit shows processing for issuing a command such as registering of an image, switching of a test setting, or resetting.

The unit property window 43 is a window screen for displaying a property of a processing unit selected on the controller list screen 41a, the work space list screen 41b or the flow view window.

The vision view window 44 is a window screen for displaying a camera image associated with the processing unit selected on the controller list screen 41a, the work space list screen 41b or the flow view window.

The result view window 45 is a window screen for displaying a parameter of the processing unit selected on the controller list screen 41a, the work space list screen 41b or the flow view window, and a simulation result.

On this editor screen 40, when a flow view button 41c arranged in a lower portion of the system view window 41 is operated, the flow view window can be displayed in place of the foregoing system view window 41. The flow view window is a window screen that displays as a flowchart a processing procedure to be executed by the image processing controller 11, and displays test setting data selected on the work space list screen 41b.

Further, when an extraction list button 45a arranged in the lower portion of the result view window 45 is operated, an extraction list window can be displayed in place of the result view window 45. The extraction list window is a window screen for extracting a parameter selected on the result view window 45 and a processing result and list-displaying an extraction result per each processing unit.

<Flow View Window>

Figure 4:
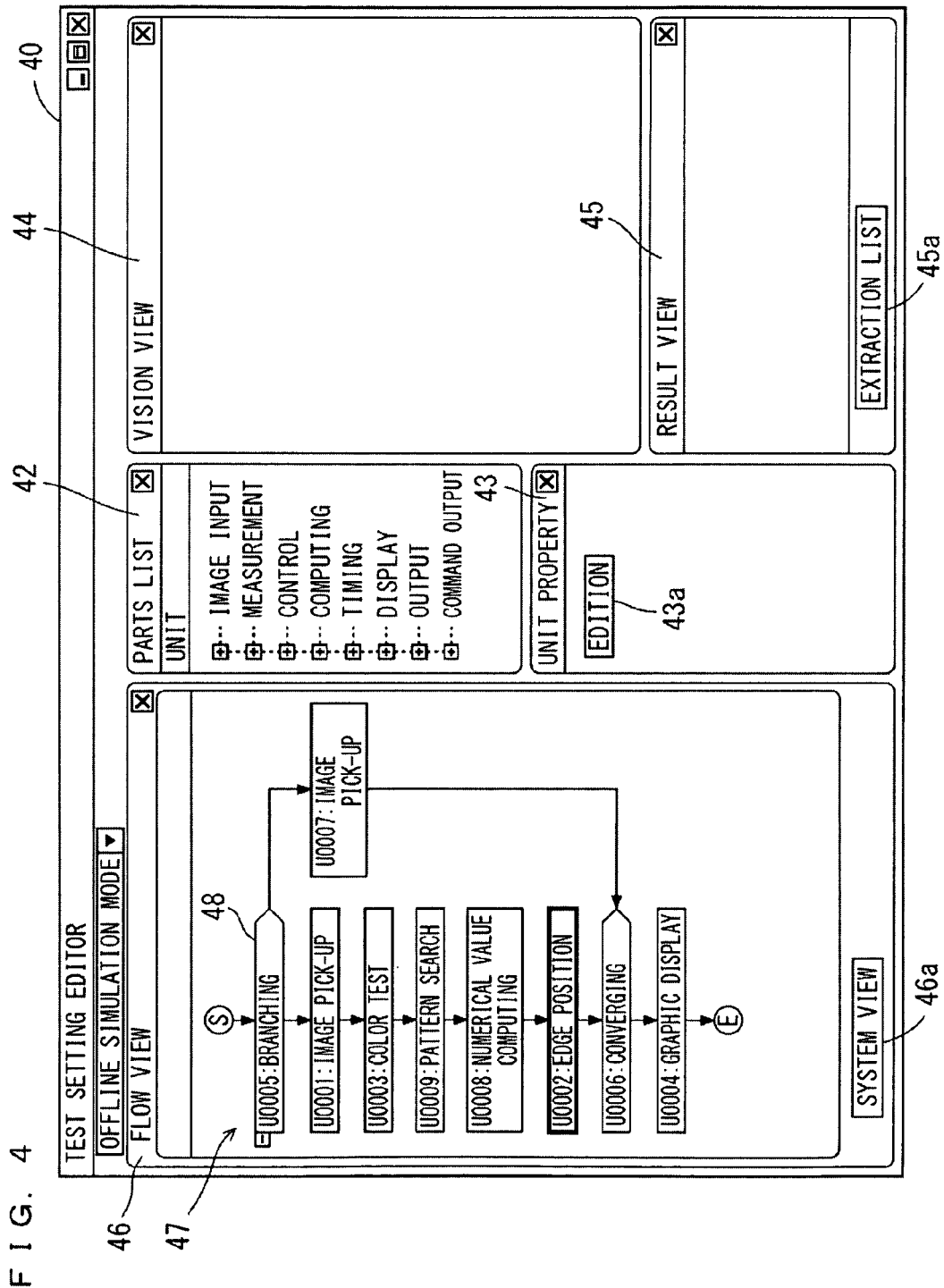
FIG. 4 is a view showing an example of the operation of the PC 2 in the test support system 100 of FIG. 2, showing the editor screen 40 where a flow view window 46 is displayed.

FIG. 4 is a view showing an example of the operation of the PC 2 in the test support system 100 of FIG. 2, and shows the editor screen 40 where a flow view window 46 is displayed. The flow view window 46 is a window screen that displays a flowchart 47 showing a processing procedure in order to newly create a control program of test setting data or edit a control program obtained from the image processing controller 11.

On the flow view window 46, a flowchart 47 configured by arraying a plurality of processing units 48 is displayed. In the flowchart 47 represented is a processing unit executed in a time-series manner on an execution flow that is started with a start symbol "S" and completed with an end symbol "E". The user can arrange the processing unit 48 on such an execution flow so as to configure a desired control program.

That is, a series of image processing to be performed by the image processing controller 11 is blocked as a processing unit, and the user can only arrange a processing unit on the execution flow inside the flow view window 46 so as to create a flow sequence in which the processing unit performs prescribed processing based upon a processing result of a processing unit immediately before this processing unit.

When a system view button 46a arranged in the lower portion of the flow view window 46 is operated, the system view window 41 can be displayed in place of the flow view window 46.

The processing unit being selected on the flow view window 46 is focus-displayed, and its property is displayed inside the unit property window 43. An edition button 43a is arranged inside the unit property window 43, and when the edition button 43a is operated, a property edition screen for editing a property of a processing unit is displayed. The property edition screen is an edition screen for specifying a parameter of a processing unit based upon a user operation or changing an already specified parameter.

<Flowchart>

Figure 5:
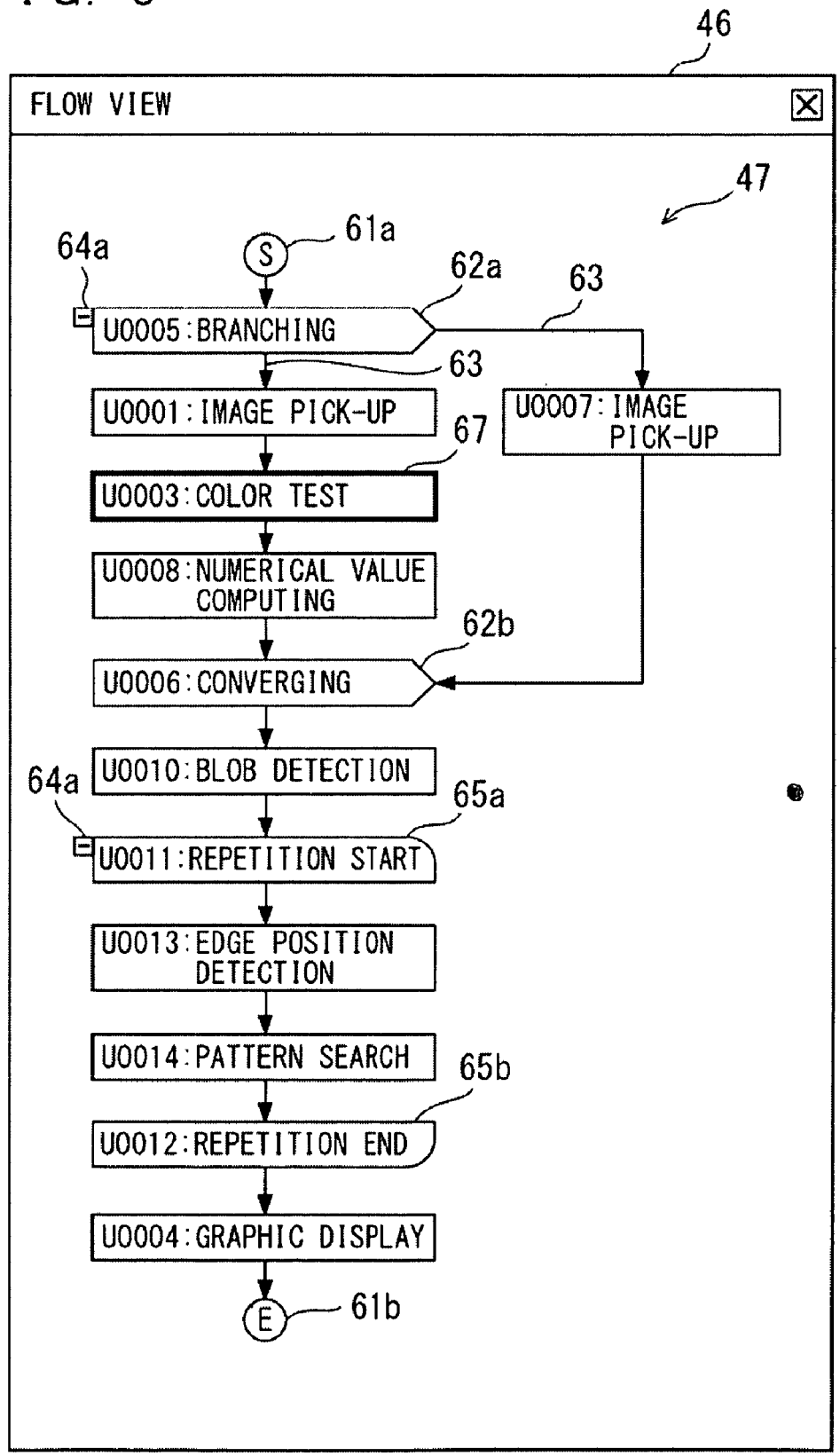
FIG. 5 is a view showing an example of the operation of the PC 2 in the test support system 100 of FIG. 2, showing an example of a flowchart 47 inside the flow view window 46.

FIG. 5 is a view showing an example of the operation of the PC 2 in the test support system 100 of FIG. 2, and shows an example of a flowchart 47 inside the flow view window 46. In this flowchart 47, a plurality of processing units are arranged on an execution flow that is started with a start symbol 61a and completed with an end symbol 61b.

In a case of creating and editing the flowchart 47 on the flow view window 46, an operation is performed using the parts-list window 42. For example, in a case of inserting a processing unit into the flowchart 47, a desired processing unit is selected on the parts-list window 42, and a position for the selected unit on the execution flow is specified by the mouse pointer or the like, so that the processing unit is inserted.

In this example, the flowchart 47 is configured by arranging a branching unit 62a, an image pick-up unit, a color test unit, a numerical value computing unit, a converging unit 62b, a blob detection unit, a repeat start unit 65a, an edge position detection unit, a pattern search unit, a repeat end unit 65b, and a graphic display unit, in this order, on the execution flow.

The branching unit 62a and the converging unit 62b are control units constituting a bypass unit, and when the bypass unit is inserted onto the execution flow, the branching unit 62a and the converging unit 62b are always inserted in pair.

In this example, the execution flow from the start symbol 61a is branched by the branching unit 62a into two branch flows 63, and the branch flows branched in this branching unit 62a is converged in the converging unit 62b. At that time, one of the branch flow 63 reaches the converging unit 62b through the image pick-up unit, the color test unit and the numerical value computing unit, whereas the other branch flow 63 is a bypass channel (diversion) that reaches the converging unit 62b through the image pick-up unit.

The repeat start unit 65a and the repeat end unit 65b are control units constituting a repeat unit, and when the repeat unit is inserted onto the execution flow, the repeat start unit 65a and the repeat end unit 65b are inserted in a pair.

In this example, the edge-position detection unit and the pattern search unit are arranged between the repeat start unit 65a and the repeat end unit 65b, and at the time of execution, the processing of the edge-position detection unit and the pattern search unit are repeated.

A folding icon 64a is arranged on the branching unit 62a and a repeat start unit 65a inside the flowchart 47. This folding icon 64a is an icon for displaying the flowchart 47 with the execution flow between the control units omitted, and is displayed adjacently to the processing unit.

Further, a processing unit selected on the flowchart 47 is focus-displayed, and can make a property of the processing unit displayed inside the unit property window 43, or change a property of the processing unit as an object to be edited.

<History Accumulation>

Figure 6:
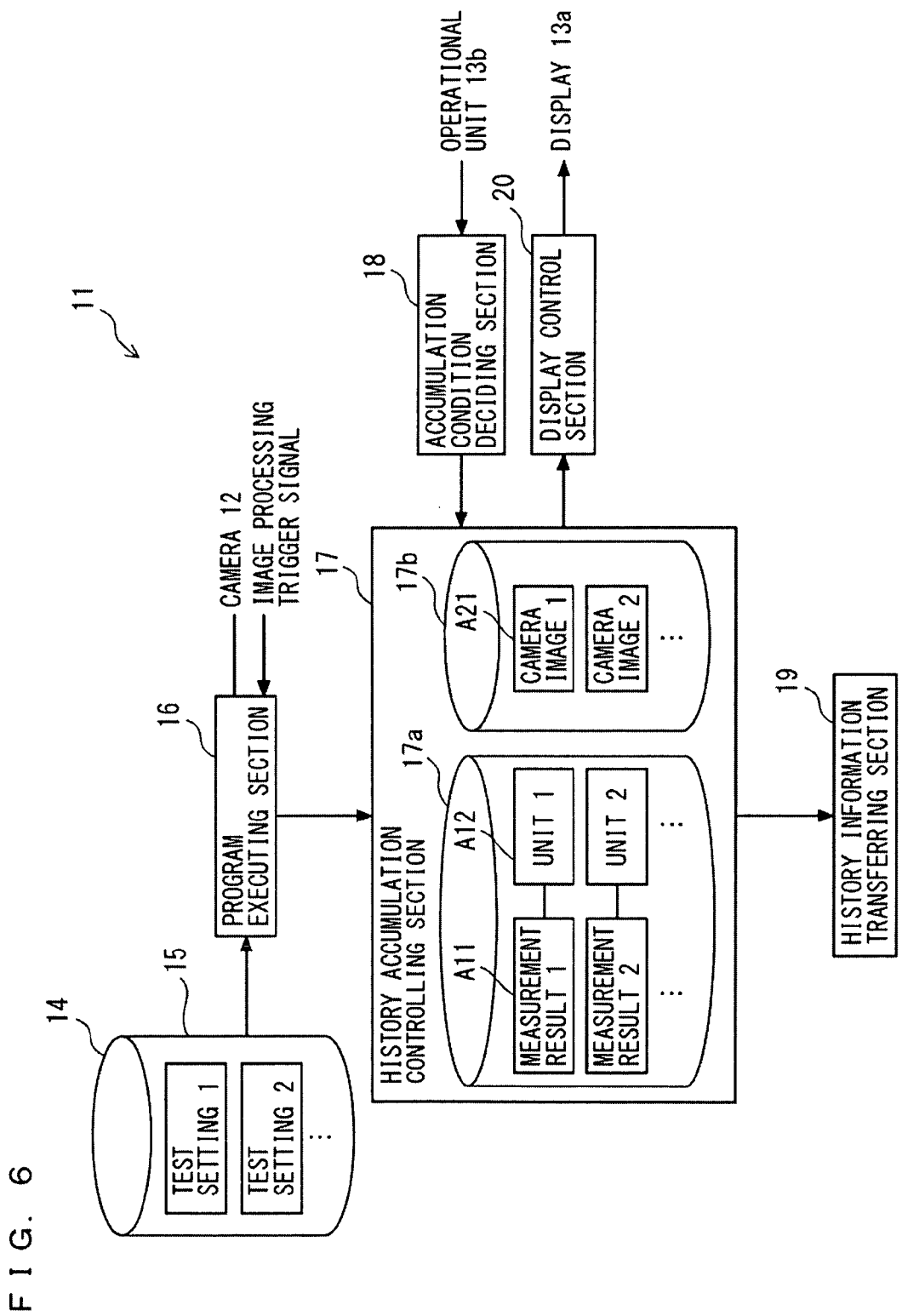
FIG. 6 is a block diagram showing a configurational example of an image processing controller 11 in the test support system 100 of FIG. 2, showing an example of a functional configuration inside the image processing controller 11.

FIG. 6 is a block diagram showing a configurational example of the image processing controller 11 in the test support system 100 of FIG. 2, showing an example of a functional configuration inside the image processing controller 11. This image processing controller 11 is configured by a memory 14, a program executing section 16, a history accumulation controlling section 17, an accumulation condition deciding section 18, a history information transferring section 19, and a display control section 20. The memory 14 is a control program storing part for holding test setting data 15 transferred from the PC 2.

The program executing section 16 is a processing section that reads and executes a control program held inside the memory 14, to perform a series of image processing. In this program executing section 16, a control program is repeatedly executed with an acquirement cycle at the time of acquiring a camera image from the camera 12 based upon an image processing trigger signal taken as a measurement cycle.

The cycle (measurement cycle) at the time of repeatedly executing the control program is defined by the flowchart 47 corresponding to the control program. Namely, the measurement cycle is set with a flow sequence from a start symbol (unit) to an end symbol on the flowchart 47 taken as image processing equivalent to one cycle. Therefore, when one image pick-up unit is arranged on the flowchart 47, every time of acquirement of one camera image as an object to be measured, one measurement is performed based upon the camera image, and a measurement result is extracted from the camera image.

In a case where a plurality of test setting data 15 are held inside the memory 14, image processing is performed based upon test setting data selected and specified by the user as an object to be executed.

The history accumulation controlling section 17 has history buffers 17a and 17b, extracts a measurement result and a camera image obtained when executing a control program as history information, and performs an operation of storing the extracted information into the history buffers 17a and 17b.

The history buffer 17a is a first history information accumulating part for extracting a result of measurement in each processing unit, executed by the program executing section 16, as history information in each measurement cycle, to hold the extracted information in association with the processing unit and the measurement cycle, and is made up of a buffer memory. In this history buffer 17a, for example, measurement result data A11 in each measurement cycle and unit identification information A12 for associating this measurement result data A11 with the processing unit are held as history information.

The history buffer 17b is a second history information accumulating part for extracting a camera image acquired from the camera 12 by the program executing section 16 during execution of a control program as history information in each measurement cycle, to hold the extracted information in association with the measurement cycle, and is made up of a buffer memory. In this history buffer 17b, for example, camera image data A21 in each measurement cycle is held as history information.

The execution method in executing, as history information, a measurement result and a camera image from a result of image processing based upon a control program includes total extraction and determination extraction. This total extraction is a method for extracting every camera image obtained in each processing unit and every measurement result in each measurement cycle as history information.

On the other hand, the determination extraction is a method for extracting history information based upon a determination result of the object to be tested in a processing unit previously specified by the user, where it is decided whether or not to extract history information in accordance with a determination result of the processing unit.

Here, processing units as objects for extraction in extracting history information based upon a determination result of a processing unit are all processing units including the above processing unit. That is, in a case of a determination result of a processing unit being a prescribed value, measurement results of all processing units including the above processing unit are extracted as history information. In such a method for extracting history information can be specified with respect to each test setting data 15.

The accumulation condition deciding section 18 performs an operation of deciding an upper limit of the number of accumulations of history information at the time when the history accumulation controlling section 17 accumulates history information inside the history buffers 17a and 17b. This upper limit of the number of accumulations is decided by the user operation, and for example, the maximum number of accumulations in accumulating history information in each measurement cycle is previously set as the upper limit of the number of accumulations.

In the history accumulation controlling section 17, an operation of overwriting history information newly extracted on old history information based upon the upper limit of the number of accumulations decided by the accumulation condition deciding section 18. Namely, when the number of accumulations of history information held inside the history buffers 17a and 17b reaches the maximum number of accumulations set by the accumulation condition deciding section 18, an operation of overwriting and storing newly extracted history information is performed. In this case, each history buffers 17a and 17b operates as a ring buffer.

Here, history information on the history buffers 17a and 17b are deleted when a control program as an object to be executed is changed.

The history information transferring section 19 performs an operation of transferring history information held inside the history buffers 17a and 17b to the PC 2. The display control section 20 performs an operation of displaying history information inside the history buffers 17a and 17b on the display 13a. This display of history information is performed based upon the user operation, and a measurement result in each processing unit is graphically displayed on a camera image.

Namely, in this image processing controller 11, the measurement result A11 in each processing unit and the camera image data A21 acquired from the camera 12 are held as history information in each measurement cycle, and a process of a series of image processing based on the control program can thus be recreated in units of processing units. At that time, both the measurement result data A11 and the camera image data A21 are held in association with the measurement cycle, and the measurement result data A11 can thus be graphically displayed on the camera image data A21 without re-execution of the control program. It is therefore possible to graphically display a measurement result on a camera image to recreate a history even during execution of another test setting data.

Further, since a state of a variable (counter or the like), which changes in time series every time of repeated execution of the control program, is reflected to the measurement result data A11, a history can be accurately recreated by holding the measurement result data A11 and the camera image data A21 in association with the measurement cycle. Further, also in a case of a control program for performing image processing with reference to an external input, since a change in a state of the external input is reflected to the measurement result data A11, a history can be accurately recreated.

Graphical display of the measurement result data A11 is made, for example, by extracting the measurement result data A11 from history information along with extraction of a parameter of a processing unit from the test setting data 15, and a graphic form showing a measurement region and a detected position is displayed on the camera image data A21.

Meanwhile, on the PC 2, an operation is performed to display history information transferred from the image processing controller 11 on the editor screen 40 based upon the user operation. At that time, the measurement result data A11 and the camera image data A21 are held as history information in each measurement cycle, and it is thus possible to graphically display the measurement result data A11 on the camera image data A21 without a simulation of the control program, so as to recreate a process of a series of image processing based upon a control program.

<Functional Configuration of Editor>

Figure 7:
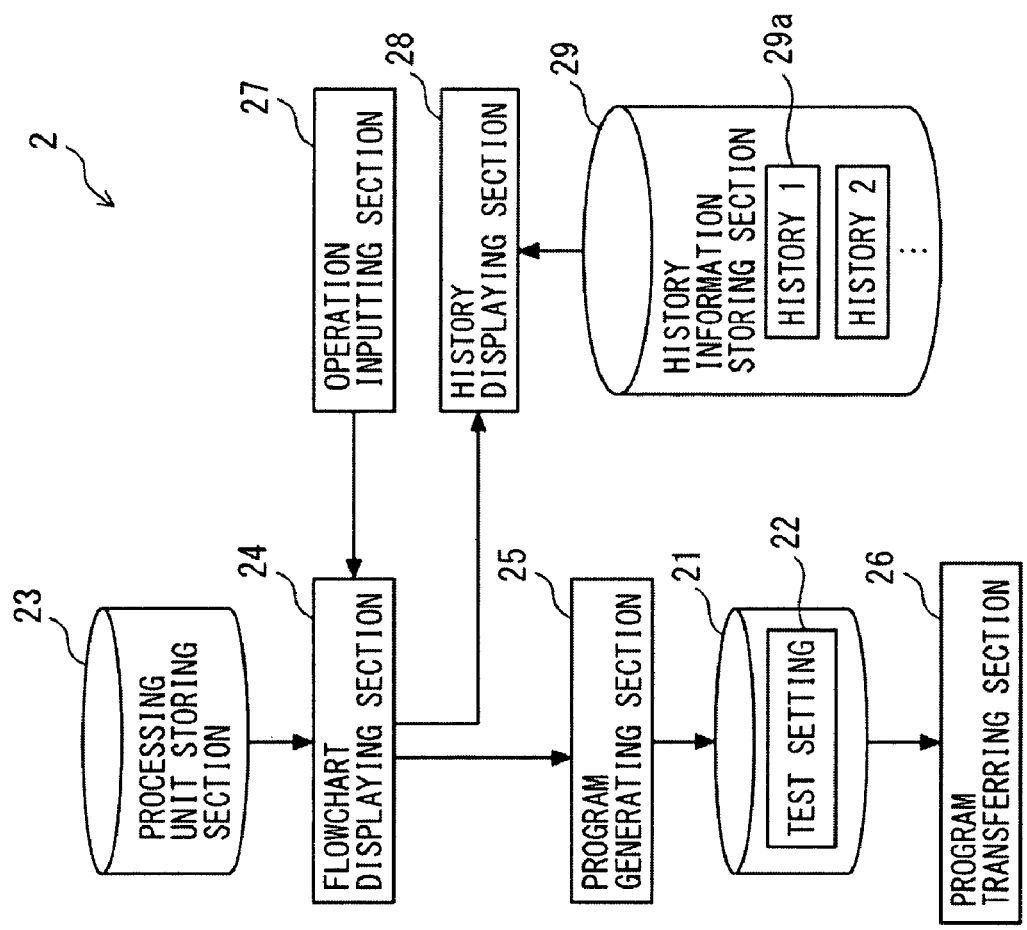
FIG. 7 is a block diagram showing a configurational example of the PC 2 in the test support system 100 of FIG. 2, showing an example of a functional configuration of an editor.

FIG. 7 is a block diagram showing a configurational example of the PC 2 in the test support system 100 of FIG. 2, showing an example of a functional configuration of an editor. This PC 2 is configured by the memory 21, a processing unit storing section 23, a flowchart displaying section 24, a program generating section 25, a program transferring section 26, an operation inputting section 27, a history displaying section 28, and a history information storing section 29.

The processing unit storing section 23 holds processing units such as an image pick-up unit and a measurement unit. The flowchart displaying section 24 displays, on the flow view window 46 of the editor screen 40, the flowchart 47 generated by arranging processing units on an execution flow that is started with a start symbol and completed with an end symbol.

The program generating section 25 performs an operation of converting the flowchart 47 created by the user on the flow view window 46 into an execution form, to generate a control program for the image processing controller 11.

The memory 21 holds the control program, generated by the program generating section 25, as the test setting data 22. The program transferring section 26 performs an operation of transferring the test setting data 22 inside the memory 21 to the image processing controller 11.

The history information storing section 29 holds history information 29a in each measurement cycle transferred from the image processing controller 11. This history information 29a is held in association with the test setting data 22 inside the memory 21.

The history displaying section 28 performs an operation of displaying, on the editor screen 40, history information 29a held inside the history information storing section 29. This history displaying section 28, for example, performs an operation of displaying history information 29a with respect to a processing unit selected by the user on the flowchart 47. Namely, history information associated with a processing unit selected by the user is extracted, and a measurement result of the extracted history information is displayed on a camera image.

Referencing a parameter of the processing unit in displaying a measurement result on a camera image enables graphical display of the measurement result. That is, the measurement result can be displayed on the PC 2 in the same manner as displayed on the display 13a during an operation of the image processing controller 11.

<Accumulation Condition Setting Screen>

Figure 8:
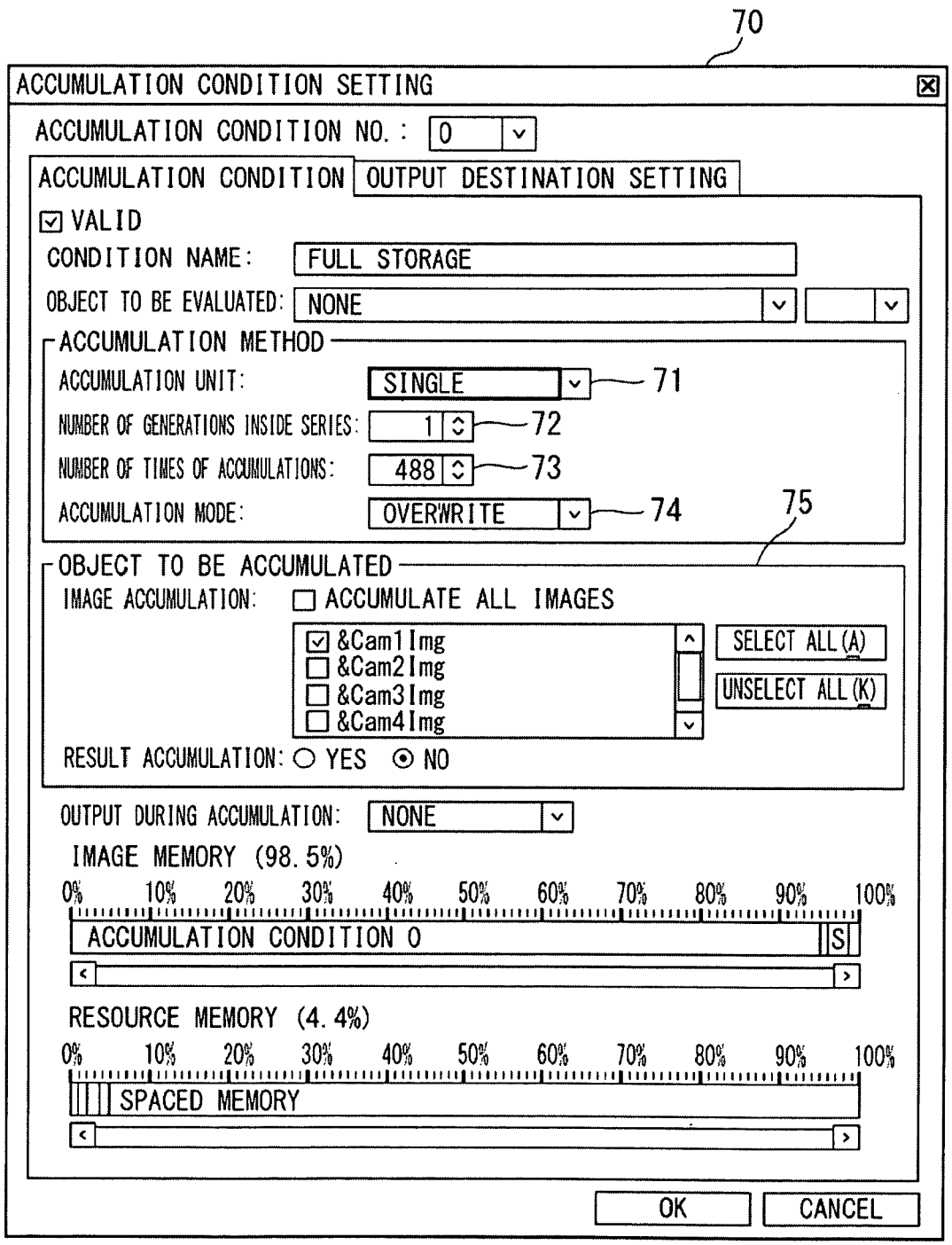
FIG. 8 is a view showing an example of the operation of the PC 2 in the test support system 100 of FIG. 2, showing an accumulation condition setting screen 70 for setting an accumulation condition.

FIG. 8 is a view showing an example of the operation of the PC 2 in the test support system 100 of FIG. 2, and shows an accumulation condition setting screen 70 for setting an accumulation condition in storing history information. This accumulation condition setting screen 70 is an input screen for setting, on the PC 2, an accumulation condition at the time when the image processing controller 11 accumulates history information, and displayed on the editor screen 40 based upon the user operation.

The accumulation condition setting screen 70 is provided, as accumulation part, with an input field 71 for specifying an accumulation unit, an input field 72 for specifying the number of generations inside a series, an input field 73 for specking the number of times of accumulations, an input field 74 for specifying an accumulation mode, and an input field 75 for specifying an object to be accumulated.

The accumulation unit is a processing unit in accumulating and storing history information in each measurement cycle, and as the accumulation unit, a "single history" with one cycle taken as a unit and a "series history" with a plurality of cycles taken as a unit are selectable. The number of generation inside a series, is the number of generations with one cycle taken as one generation, and the number of generation accumulated and stored can be selected and specified.

The number of times of accumulations is the upper limit of the number of accumulations in accumulating and storing history information. The accumulation mode is a method for writing history information into a memory in accumulating and storing the information, and either an overwriting mode or a non-overwriting mode can be selected.

In the input field 75 for an object to be accumulated, a camera image as an object to be accumulated is selected and specified, or whether or not a measurement result is to be accumulated can be selected.

Transferring input information selected and specified on the accumulation condition setting screen 70 to the image processing controller 11 can accumulate history information in a desired accumulation condition.

<History Recreation>

Figure 9A:
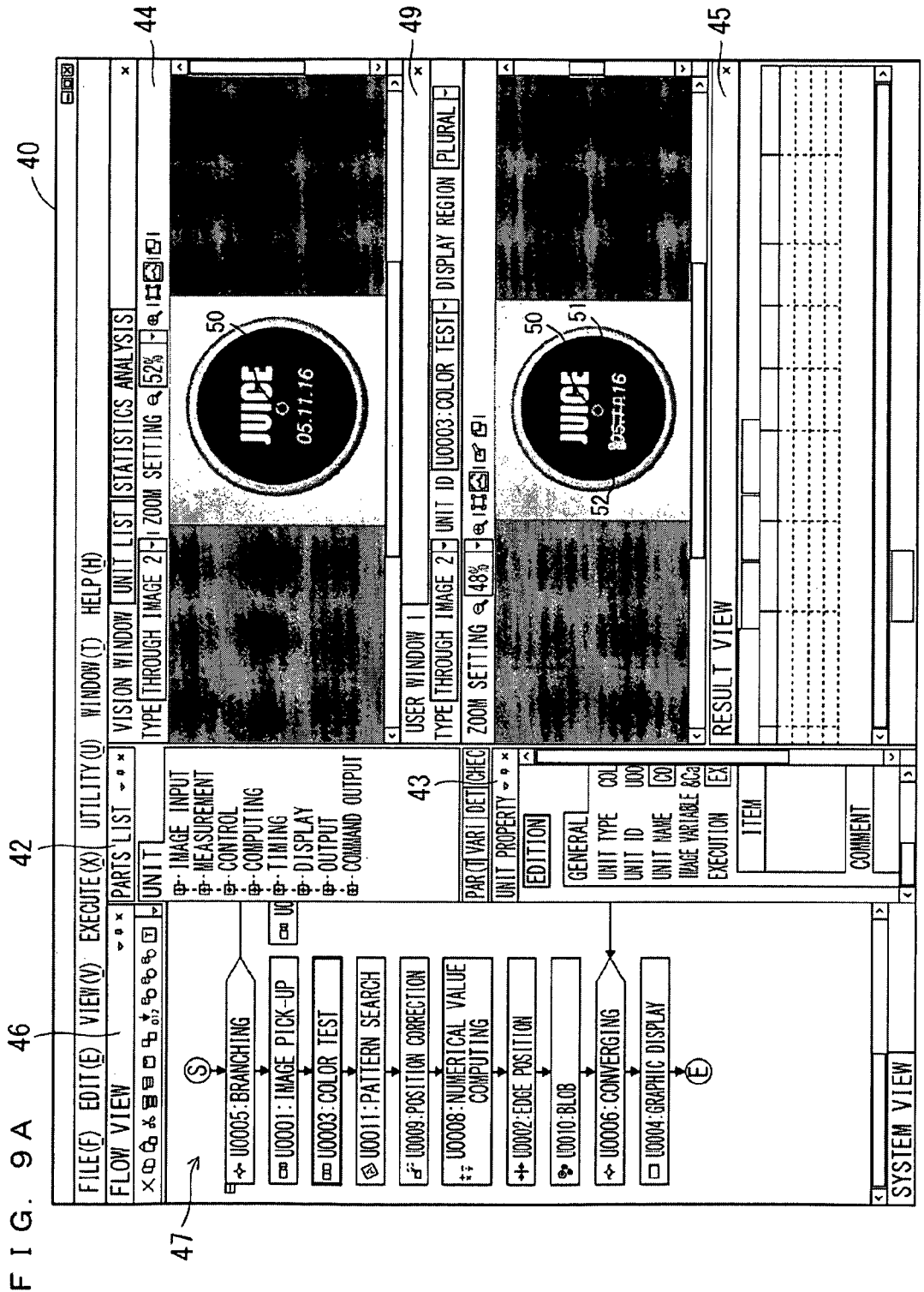
FIG. 9A is a view showing an example of the operation of the PC 2 in the test support system 100 of FIG. 2, showing the editor screen 40 where history information is displayed.

FIGS. 9A and 9B are views showing an example of the operation of the PC 2 in the test support system 100 of FIG. 2, and shows the editor screen 40 where history information is displayed inside the vision view window 44 and a user window 49. The vision view window 44 and the user window 49 are window screens for displaying a camera image.

In a history recreation mode for displaying history information inside the vision view window 44 and the user window 49, a camera image used for image processing in a processing unit selected on the flow view window 46 is displayed as history information inside the vision view window 44. It is to be noted that as a display method in displaying a camera image, either a through image or an image after filter processing can be selected. When the though image is selected as the display method, a camera image held as history information, as well as a camera image used for image processing in a processing unit selected on the flowchart, is displayed as it is. On the other hand, when the image after filter processing is selected, a camera image used for image processing in the processing unit, as well as a camera image made up of image data after filter processing performed as preprocessing of processing for obtaining measurement result, is displayed.

In this example, a camera image (through image) used in color test processing in the color test unit is displayed. On this camera image, a graphic form showing an image region as an object to be tested, namely a circular frame 50, is graphically displayed.

Meanwhile, in the user window 49, history information of a plurality of processing units selected on the flow view window 46 are simultaneously displayed. In this example, on the camera image used in image processing in the color test unit and the edge-position detection unit, the circular frame 50 showing a test region of a color test, a line 52 showing an edge detected in edge-position detection, and a rectangular frame 51 showing a measurement region of the edge-position detection are displayed.

Further, inside the result view window 45, parameter of the processing units selected on the flow view window 46 and a measurement result as history information are displayed. Inside this result view window 45, parameters specified by the user on an edition dialog at the time of editing properties of processing units are list-displayed.

According to the present embodiment, since a measurement result extracted as history information is held in association with a processing unit, a process of a series of image processing based upon a control program can be recreated in units of processing units. In particular, since the measurement result and the camera image when executing the control program are extracted as the history information, and are both held in association with the measurement cycle, displaying the measurement result accumulated as the history information in this manner enables graphical display of the measurement result on the camera image without re-execution of the control program. It is thus possible to faithfully recreate a series of image processing based upon the control program. Further, since it is just that the measurement result accumulated as the history information is displayed, and recalculation for obtaining the measurement result from the camera image is not required, it is possible to display the measurement result on the camera image without a suspension of operation of the image processing controller 11.

Moreover, since a measurement result in association with a processing unit selected on the flowchart 47 is displayed on a camera image in displaying history information on the editor screen 40 on the PC 2, it is possible to recreate a process of a series of image processing based upon a control program in units of processing units without a simulation of the image processing. At that time, since display is made based upon a parameter of the processing unit, it is possible to graphically display the measurement result accumulated as the history information on the camera image.

What is claimed is:

1. An image processing controller, used in a test support system including
   a camera which photographs an object to be tested, to generate a camera image,
   the image processing controller which acquires the camera image from the camera, extracts a measurement result from the camera image, and determines the quality of the object to be tested based upon this measurement result, to output a determination signal, and
   a program creation apparatus which creates a control program for the image processing controller,
   the program creation apparatus having
   a processing unit storing part for holding two or more processing units that show image processing,
   a flowchart generating part for arranging the processing units on an execution flow that is started with a start symbol and completed with an end symbol to generate a flowchart,
   a program generating part for generating a control program for the image processing controller based upon the flowchart, and
   a program transferring part for transferring the control program to the image processing controller,
   the image processing controller comprising:
   a program storing part for holding the control program transmitted from the program creation apparatus;
   a program executing part for repeatedly executing the control program with a flow from the start symbol to the end symbol on the flowchart taken as a measurement cycle;
   a first history information accumulating part for extracting a result of the measurement in each of the processing units, executed by the program executing part, as history information in each of the measurement cycles and holding the extracted result in association with the processing unit and the measurement cycle;
   a second history information accumulating part for extracting the camera image, acquired from the camera by the program executing part during execution of the control program, as history information in each of the measurement cycles and holding the extracted image in association with the measurement cycle; and
   a history information transferring part for transferring history information, held in the first history information accumulating part and the second history information accumulating part, to the program creation apparatus.

2. The image processing controller according to claim 1, wherein the first history information accumulating part extracts history information based upon a determination result of the object to be tested in a previously specified processing unit.

3. The image processing controller according to claim 1, comprising an accumulation condition deciding part for deciding an upper limit of a number of accumulations of the history information, wherein the first and second history information accumulating part rewrite newly extracted history information onto old history information based on the upper limit of the number of accumulations.

4. An image processing controller, used in a test support system including
   a camera which photographs an object to be tested, to generate a camera image,
   the image processing controller which extracts a measurement result from the camera image, and determines the quality of the object to be tested based upon this measurement result, to output a determination signal,
   a display which is display controlled by the image processing controller, and displays the measurement result,
   an operational unit for operating the image processing controller, and
   a program creation apparatus which creates a control program for the image processing controller,
   the program creation apparatus having
   a processing unit storing part for holding two or more processing units that show image processing where a parameter is changeable,
   a flowchart generating part for arranging the processing units on an execution flow that is started with a start symbol and completed with an end symbol, to generate a flowchart,
   a program generating part for generating a control program for the image processing controller based upon the flowchart, and
   a program transferring part for transferring the control program to the image processing controller,
   the image processing controller comprising:
   a program storing part for holding the control program transmitted from the program creation apparatus;
   a program executing part for repeatedly executing the control program with a flow from the start symbol to the end symbol on the flowchart taken as a measurement cycle;
   a first history information accumulating part for extracting a result of the measurement in each of the processing units, executed by the program executing part, as history information in each of the measurement cycles and holding the extracted result in association with the processing unit and the measurement cycle;
   a second history information accumulating part for extracting the camera image, acquired from the camera by the program executing part during execution of the control program, as history information in each of the measurement cycles and holding the extracted image in association with the measurement cycle; and
   a history displaying part for displaying, on the display, history information held in the first history information accumulating part and the second history information accumulating part,
   wherein the history displaying part displays, on the camera image, the measurement result held in association with a processing unit selected by an operation of the operational unit based upon the parameter of the processing unit.

5. A test support system, comprising:
   a camera which photographs an object to be tested, to generate a camera image;
   the image processing controller which extracts a measurement result from the camera image, and determines the quality of the object to be tested based upon this measurement result, to output a determination signal; and
   a program creation apparatus which creates a control program for the image processing controller,
   the program creation apparatus having
   a processing unit storing part for holding two or more processing units that show image processing where a parameter is changeable,
   a flowchart displaying part for displaying, on an edition screen, a flowchart generated by arranging the processing units on an execution flow that is started with a start symbol and completed with an end symbol, a program generating part for generating a control program for the image processing controller based upon the flowchart, and a program transferring part for transferring the control program to the image processing controller, wherein the image processing controller includes a program storing part for holding the control program transmitted from the program creation apparatus, a program executing part for repeatedly executing the control program with a flow from the start symbol to the end symbol on the flowchart taken as a measurement cycle, a first history information accumulating part for extracting a result of the measurement in each of the processing units, executed by the program executing part, as history information in each of the measurement cycles and holding the extracted result in association with the processing unit and the measurement cycle, a second history information accumulating part for extracting the camera image, acquired from the camera by the program executing part during execution of the control program, as history information in each of the measurement cycles and holding the extracted image in association with the measurement cycle, and a history information transferring part for transferring history information held in the first history information accumulating part and the second history information accumulating part to the program creation apparatus, the program creation apparatus includes a history information storing part for holding the history information transferred from the image processing controller, and a history displaying part for displaying the history information on the edition screen, and the history displaying part displays, on the camera image, the measurement result in association with a processing unit selected on the flowchart based upon the parameter of the processing unit.

* * * * *